United States Patent Office 3,261,751
Patented July 19, 1966

3,261,751
PROCESS OF PRODUCING HAMYCIN ANTIBIOTIC
AND PRODUCT PRODUCED
Mandayam J. Thirumalachar, Pimpri, near Poona, India, assignor to Hindustan Antibiotics Limited, Pimpri, near Poona, India, an Indian company
No Drawing. Filed Oct. 13, 1961, Ser. No. 144,836
10 Claims. (Cl. 167—65)

The present invention relates to a new antifungal antibiotic which, for convenience, will hereinafter be termed "Hamycin" and a process for its manufacture.

This application is a continuation-in-part of my application Serial No. 84,755, filed January 25, 1961, and now abandoned.

The antibiotic "Hamycin" is produced along with at least 4 antibacterial antibiotics in the culture of a new species of Actinomycetes of the genus Streptomyces hereinafter referred to as *Streptomyces pimprina*. It was isolated from a soil sample collected in Pimpri, near Poona, and is preserved in Research Laboratories of Hindustan Antibiotics Research Centre, Pimpri, near Poona, under the identification number 2510.

DESCRIPTION OF THE STRAIN

*Streptomyces pimprina* is different from the other Streptomyces so far described, but shows close resemblance to *Streptomyces celluloflavus* Nashim and Kimura in the type of mycelium and sporing structures. The submerged mycelium is mostly yellow in colour, the aerial mycelium being powdery white with cream to pale buff coloured patches. Few imperfect spirals are formed on some media, the conidia in such cases being arranged in chains. In the growth characters on the various differential media *Streptomyces pimprina* is distinct from *Streptomyces celluloflavus*.

For the purposes of further characterization, there is described below the growth of *Streptomyces pimprina* on various nutrient media.

*Czapek's agar:* Growth thin, transparent, submerged mycelium greenish-yellow, producing greenish-yellow soluble pigment. Aerial hyphae sparsely developed patches.

*Dextrose agar (Krainsky):* Growth moderate.

*Tyrosine agar:* Mycelium submerged, slightly purple, colony flat, with pinkish colour on reverse with no diffusible pigment.

*Calcium malate agar:* Growth profuse, aerial mycelium white and dusty at first, later pale cream coloured, reverse lemon-yellow, with no soluble pigment.

*Glycerol asparagine agar:* Growth profuse, dusty-white to pale cream coloured aerial hyphae, reverse deep lemon-yellow, with greenish-yellow soluble pigment.

*Emerson's medium:* Profuse growth, dusty-white to pale-yellow with buff coloured patches, with droplets of exudate on colony surface, soluble pigment none.

*Bennet's agar:* Abundant dusty white cream coloured aerial mycelium, growth profuse and raised, reverse greenish-yellow, producing greenish-yellow soluble pigment.

*Litmus milk:* Growth moderate, litmus slightly reduced, and milk slightly coagulated.

*Potato:* Growth in crusts, no aerial mycelium, potato turning greenish-yellow due to the pigment and later turning brown.

*Carrot:* Growth poor, no soluble pigment.

*Starch agar:* Growth moderate, hydrolysis poor.

*Gelatine liquifaction:* Moderate.

*Nitrates:* Not reduced.

When examined by the method of T. G. Pirdham and D. Gottleib (J. Bact., 56: 107, 1948) for the utilization of various carbon sources, the results have been as follows:

Arabinose +          Lactose (−)
Levulose +           Mannitol (+)
Dextrose +           Dulcitol (−)
Galactose (+)        Glycerol +
Saccharose (+)       Starch (+)
Maltose +

The above indications have the following meaning:

+ = good growth, definite use of carbon source used.
(+) = weak growth, use of carbon source limited or slight.
(−) = poor growth, and use of carbon source improbable.

The present invention as regards the production of the antibiotic "Hamycin" is not limited to the use of *Streptomyces pimprina* or other strains corresponding to this description, but also comprises the use of variants of these organisms, as produced, for example, by selection or mutation, especially under the influence of ultraviolet or X-rays or of nitrogen mustard oils.

For the production of the antibiotic "Hamycin" a Streptomyces strain possessing the properties of *Streptomyces pimprina* is aerobically cultured, for example, in an aqueous nutrient solution containing inorganic salts, nitrogenous compound and carbohydrates until the fermentation broth exhibits an appreciable antifungal effect and the "Hamycin" is then isolated from the filtered mycelium.

The nutrient solution contains as inorganic salts, for example, chloride, nitrates, carbonates and sulphates of the alkali metals, alkaline earth metals, magnesium, iron, zinc or manganese. As nitrogenous compounds and the carbohydrates and the growth promoting substances that may be added, these may be mentioned for example cornsteep liquor, soyabean meal, oil cakes, peptones, cereal grains such as jowar, sugars such as sucrose, glucose, lactose, starches and the like.

The culture takes place aerobically, that is to say, for example, in stationary surface culture of preferably submerged with shaking or stirring with air or oxygen in shaking vessels or in the known fermenters. The temperature between 20 and 40° C. is suitable for the purpose. The fermentation broth exhibits an appreciable antifungal effect in general after 3 to 5 days.

For isolation of the antifungal antibiotic "Hamycin" the following process can, for example, be used. The mycelium is separated from the culture by filtration, after which the majority of the antifungal antibiotic is found in the mycelium. The culture filtrate contains very little antifungal activity, but contains instead at least 4 antibacterial antibiotics which can be separated by paper chromatography with benzene saturated with formamide as the developing solvent, the paper having been soaked in acetone containing 20% formamide. In this solvent system in ascending chromatography, the 4 antibacterial antibiotics have the following $R_f$'s. (i) 0.0, (ii) 0.4, (iii) 0.71, (iv) 0.92. There is also one more component with $R_f$ 0.98 but with very little antibacterial activity. The active components can be detected by bioautographic technique using *Sarcina lutea* as the test organism. The antifungal antibiotic is advantageously extracted, by washing the mycelium first with chloroform and then extracting the chloroform washed mycelium with aliphatic alcohols, containing 1 to 5 carbon atoms. The alcoholic extract is concentrated to a small volume under reduced pressure and the separated brownish yellow solid material is removed either by centrifugation or by filtration. Instead of washing the mycelium with chloroform before extracting with alcohol, the mycelium can be extracted first with alcohol, and the brownish yellow solid material obtained after concentration of alcohol extract can be washed with chloroform. The brownish yellow material is then successively washed with benzene, water and methanol and the remaining yellowish amorphous powder is dissolved in hot aqueous lower alcohol and activated charcoal is added, if necessary and filtered. On cooling "Hamycin" is obtained as yellow amorphous powder.

"Hamycin" does not have any definite melting point and contains carbon hydrogen and nitrogen. Sulphur and halogen are absent. Chemical analyses of a number of samples of purified "Hamycin" averaged carbon, 58.2 percent; hydrogen, 8.3 percent; and nitrogen 2.1 percent. From the microanalytical data the empirical formula can be deduced as $C_{32}H_{55}NO_{13}$. The infra-red spectrum of "Hamycin" taken in potassium bromide shows among others the following prominent peaks at $3\mu$, $3.45\mu$, $4.35\mu$, $5.8\mu$, $5.85\mu$, $6.1\mu$, $6.15\mu$, $6.21\mu$, $8.5\mu$, $9.35\mu$, $9.9\mu$, $11.8\mu$, and $12.5\mu$. Its ultra-violet absorption spectrum (in 80% methanol) shows peaks at the following wave lengths 230 m$\mu$, 285 m$\mu$, 345 m$\mu$, 363 m$\mu$, 383 m$\mu$, and 406 m$\mu$.

(max. 383 m$\mu$ $E_{1\,cm.}^{1\%}$ 916)

"Hamycin" is an amphoteric compound, with conjugated polyene (heptaene) structure and is almost insoluble in water, benzene, chloroform, dry lower aliphatic alcohols and ether. It is, however, soluble in basic solvents such as pyridine and collidine, and in aqueous lower alcohols. With concentrated sulphuric acid it gives a stable blue colour. It does not give any colouration with ferric chloride or with hydorchloric acid.

There are a few well characterized amphoteric heptaenes reported in literature. Based on the ultra-violet absorption spectrum two broad groups can be distinguished. The ascosin - trichomycins-candicidin-PA 150 group is characterized by major absorption maxima at 358 m$\mu$, 377 m$\mu$ and 399 m$\mu$, while the candidin-amphotericin B group has the major absorption maxima at 363 m$\mu$, 383 m$\mu$ and 406 m$\mu$. (Vining L. C., Hindustan Antibiot. Bull., 1960, 3, 48.) Hamycin belongs to the latter group, with the major absorption maxima at 363 m$\mu$, 383 m$\mu$, and 406 m$\mu$. Hamycin however can be distinguished from candidin (Vining, L. C., and Taber, W. A., Cand. J. Chem., 1956, 34, 1163) and amphotericin B (Vandeputte, J. et al., Antibiot. Ann., 1955–56, 587) from its very high activity against *Candida albicans* (given in the following paragraph) as compared to the activity of candidin and amphotericin B. Under the same conditions of testing by serial dilution method Hamycin has an inhibitory concentration of 0.01$\mu$ g./ml. against *C. albicans* while candidin and amphotericin B have inhibition concentration in the range of 0.5$\mu$ g.–1.0$\mu$ g./ml. against the same organism. Besides this biological difference Hamycin also differs from other heptaenes in its behaviour in paper chromatography. With iso-propyl alcohol-water (60:40) as the developing solvent and by bioautographic technique using *Saccharomyces cerevisae* as the test organism, Hamycin has R$f$ 0.83, candidin has R$f$ 0.61, Trichomycin has R$f$ 0.86, and amphotericin B has R$f$ 0.70. Hamycin is thus distinct from candidin and amphotericin B from its biological properties and paper chromatographic behaviour.

The antibiotic "Hamycin" possesses an antibiotic activity with respect to various fungi. By the standard procedure in serial dilution method in nutrient broth, containing glucose incubated for 24 hours at 28° C., the following inhibition concentrations are obtained.

| Test organism | Inhibiting concentration, $\mu$ g./ml. |
| --- | --- |
| *Candida albicans* | 0.01 |
| *Cryptococcus neoformans* | 0.006 |
| *Aspergillus niger* | 0.1 |
| *Curvularia lunata* | 0.025 |
| *Saccharomyces* Sp. | 0.1 |
| *Alleschéria boydii* | 5–10 |

Because of its very high activity against the fungus *Candida albicans* and other pathogenic fungi, Hamycin can be used externally as glycerine suspension for treatment of oral thrush caused by *C. albicans*, otomycosis incited by *Aspergillus niger* or in the form of lactose tablets for the treatment of vaginal moniliasis.

The invention is illustrated but in no way limited by the following examples.

*Example 1*

A nutrient medium is prepared as follows:

| | Percent |
| --- | --- |
| Soyabean | 2.0 |
| Glucose | 2.0 |
| Ammonium sulphate | 0.3 |
| Sodium chloride | 0.25 |
| Calcium carbonate | 0.6 |
| Potassium dihydrogen phosphate | 0.05 |

The medium is adjusted to pH 6.5 to 7.0, sterilized in steam at 15 lb. for 15 minutes, and inoculated, when cold, with 48 hours' vegetative growth of *Streptomyces pimprina* at the rate of 3 to 5%. Fermentation is carried out aerobically in 500 ml. shake flask containing 100 ml. to 125 ml. of the medium and the flask shaken, at 24° to 30° C. for 96–144 hours till a sufficient activity is imparted to the culture. The culture broth is then harvested and the mycelium is separated from the fluid by filtration, or centrifugation.

*Example 2*

The mycelium obtained by filtration of 10 litres of the culture according to the Example 1 is stirred with 600 ml. of chloroform and filtration is carried out again. The mycelium is washed once again with 600 ml. of chloroform and filtered. The chloroform washed mycelium is then extracted successively three times with n-butanol (800 ml. each time), by stirring and then butanolic filtrates are combined and concentrated under reduced pressure to about 50 ml., cooled, and the slurry thus obtained is centrifuged. The supernatant is separated and the yellowish brown sediment is again washed with 50 ml. n-butanol. The yellowish insoluble product is then successively washed with benzene (twice, 40 ml. each time), methanol (once, 30 ml.), water (once, 50 ml.), and again methanol (twice, 30 ml. each time). The yellow amorphous powder thus obtained is dissolved in hot (70° C.) 50% ethyl alcohol (500 ml.) activated charcoal is added and the solution filtered. The filtrate on cooling gives "Hamycin" as amorphous yellow powder (500 mg.), which is separated by filtering or centrifuging and dried in vacuo over silica gel.

*Example 3*

Fermentation medium was prepared containing the following ingredients:

| | Percent |
| --- | --- |
| Peanut meal | 2.0 |
| Glucose | 2.0 |
| Corn steep liquor (concentrate) | 0.5 |
| Ammonium sulphate | 0.25 |
| Sodium chloride | 0.25 |
| Calcium carbonate | 0.25 |

The medium was sterilized in the tank itself with steam for approximately 30 minutes under about 15 lb. pressure. The pH after sterilization was 6.5–6.8.

The tank was inoculated with 48 hours' vegetative growth of *Streptomyces pimprina*. For the seed the organism was grown aseptically in the following medium:

| | Percent |
| --- | --- |
| Corn steep liquor (concentrate) | 1.0 |
| Starch | 2.5 |
| Ammonium sulphate | 0.5 |
| Sodium chloride | 0.5 |
| Calcium carbonate | 0.5 |

The amount of inoculum was approximately 2 percent by volume. The fermentation was conducted with agitation and aeration. The air flow was about 0.5 to 2 litres of air per litre of the fermenation medium. Excessive foaming was controlled by solution of octadecanol in peanut oil. The fermentation was best conducted at a temperature of about 28° C. for 72 hours to 84 hours. At the end of this time when sufficient activity is imparted to the culture fluid, the fermentation fluid was withdrawn for the recovery of "Hamycin."

*Example 4*

1000 litres of the fermentation fluid was filtered and the filtered broth was processed to obtain the antibacterial antibiotics. The filtered mycelium after washing with a little water, was extracted with 200 litres of n-butanol. The mycelium was again extracted with 150 litres of n-butanol saturated with water. The two butanol extracts were combined, washed with water and concentrated under reduced pressure at temperature not exceeding 45° C. to about 35 litres. The concentrate containing suspension was filtered and the cake was washed with n-butanol (5 litres), chloroform (5 litres), benzene (5 litres) and finally with dry ethyl alcohol (5 litres). The crude "Hamycin" thus obtained (100 gm.) was dissolved in hot 50% ethyl alcohol (50 litres), charcoal and filter aid added and filtered. On cooling about 50 gm. of pure "Hamycin" was obtained as yellow amorphous powder. The mother liquor on concentration gave another crop of about 25 g. of "Hamycin."

What I claim is:

1. A process for producing the antibiotic substance Hamycin, which comprises inoculating an aqueous nutrient medium with a culture of *Streptomyces pimprina*, allowing aerobic fermentation to take place and recovering Hamycin from the fermentation liquor.

2. A process according to claim 1, in which the fermentation is carried out at a temperature of about 26° to 28° C. for a period of 72 hours to 84 hours.

3. A process according to claim 1, in which the nutrient medium contains a usable carbonaceous substance, a source of assimillable nitrogen and mineral substances essential for the growth of bacteria.

4. A process according to claim 1, in which the mycelium is extracted with an aliphatic alcohol having from 2 to 5 carbon atoms, separating the extract from the residual solids and recovering the said antibiotic from the extract.

5. A process according to claim 4, in which said alcohol is n-butanol.

6. A process according to claim 4, which includes concentrating the alcoholic extract of Hamycin at a temperature not in excess of about 50° C. until the said antibiotic substance begins to precipitate therefrom, and separating the precipitated Hamycin.

7. A process according to claim 5, in which the precipitated antibiotic substance is washed successively with chloroform, benzene and dry ethyl alcohol.

8. A process according to claim 6, in which the solvent washed precipitated antibiotic is crystallized from aqueous 60% aliphatic alcohol containing 1 to 3 carbon atoms.

9. A process according to claim 8, in which the said alcohol is ethyl alcohol.

10. An antibiotic substance Hamycin, prepared according to the process of claim 1, which is amphoteric, has the absorption maxima in the ultra-violet region of the spectrum at 230 m$\mu$, 285 m$\mu$, 345 m$\mu$, 363 m$\mu$, 383 m$\mu$ with $$E_{1\ cm.}^{1\%} = 916$$

and 406 m$\mu$ when dissolved in 80% methanol, an average composition by weight of 58.2% carbon, 8.3% hydrogen, 2.1% nitrogen and 31.4% oxygen (by difference); with 60% isopropanol as developing solvent on paper chromatography an R$f$ of 0.83, and in potassium bromide pellet exhibits characteristic absorption in the infra-red region at the following frequencies: 3.0$\mu$, 3.45$\mu$, 4.35$\mu$, 5.8$\mu$, 5.85$\mu$, 6.1$\mu$, 6.15$\mu$, 6.21$\mu$, 8.5$\mu$, 9.35$\mu$, 9.9$\mu$, 11.8$\mu$, and 12.5$\mu$.

References Cited by the Examiner

J. Pharm. and Pharmacol., 14, 320 (1962).

JULIAN S. LEVITT, *Primary Examiner.*

SAM ROSEN, *Assistant Examiner.*